Aug. 1, 1967 R. L. PRICE 3,334,316

FEEDBACK MODULATOR OSCILLATOR

Filed Aug. 13, 1964

INVENTOR:
R. Lee Price

By Smyth, Roston & Pavitt
Attorneys

United States Patent Office 3,334,316

Patented Aug. 1, 1967

3,334,316

FEEDBACK MODULATOR OSCILLATOR

Robert Lee Price, Thousand Oaks, Calif., assignor to Minnesota Mining and Manufacturing Company, St. Paul, Minn., a corporation of Delaware Filed Aug. 13, 1964, Ser. No. 389,248
12 Claims. (Cl. 332—14)

ABSTRACT OF THE DISCLOSURE

A magnetic multivibrator established by transistors and a coil on a saturable core is provided with a feedback winding on the core connected to a demodulator without filter to produce a broadband signal which is combined with a reference signal to form an error signal which in turn is combined in a differential amplifier with a modulator signal, the resulting signal being fed through a low impedance stage to the multivibrator.

Figure 1:
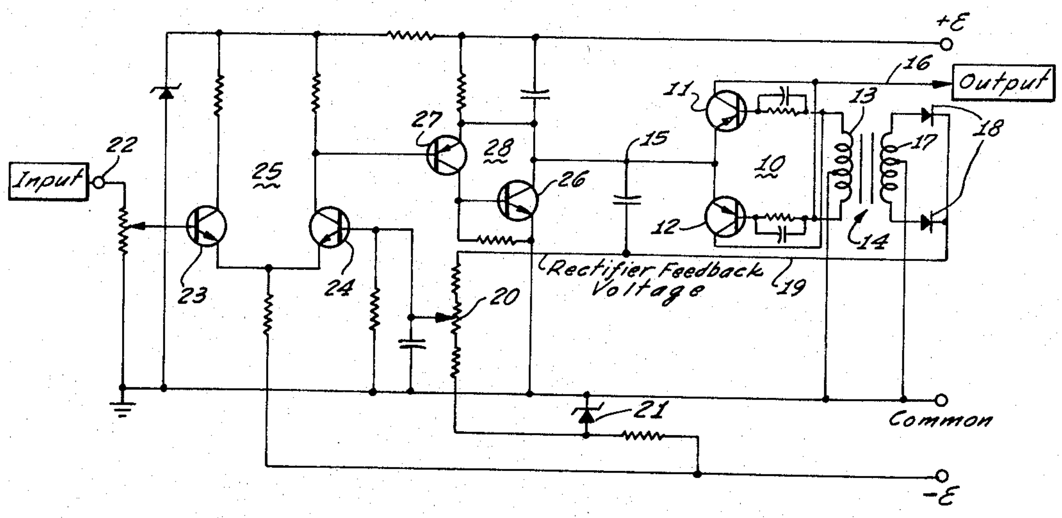

The present invention relates to frequency modulated oscillators. More particularly, the invention relates to improvements in voltage controlled magnetic multi-vibrators.

Magnetic multi-vibrators usually operate with a saturable inductance and two switching elements such as transistors. The inductance coil has a center tap, and the current flowing into and out of the ends of the inductance coil is respectively governed by the two switching elements. The two switching elements, furthermore, have their controlled input connected to this inductance in such a manner that either switching element governs the current until the inductance is driven into saturation in one particular direction. During this phase of operation the respective other switching element is cut off or blocked. Upon reaching the saturation point the conducting switching element is cut off and the other switching element is opened and the current in the inductance is reversed for flux reversal until saturation is reached in opposite direction.

In case a particular voltage is being applied to the two switching elements for determining the current through the inductance coil, the frequency of this oscillator is dependent primarily upon the saturation flux of the inductance and the voltage supplied to the switching elements. In case the saturation flux is constant the frequency is a more or less linear function of the input voltage for the switching elements.

However, the constance of the saturation flux as presupposed is difficult to be realized, because the core losses are temperature dependent to a considerable extent. Furthermore, for increased inductance, the saturation flux is not completely constant. The temperature of the inductance changes either because the ambient temperature changes or pursuant to extensive oscillation operation at relatively high voltages eddy currents are induced in the inductance core and heating it up. No truly stable operation is obtainable and there even may occur an irregular drift. If the temperature of the core changes are irregular, the difficulties are enhanced in that different lots of otherwise very similar core materials exhibit different thermal behavior. The commercially available ferromagnetic core material exhibits approximately 2.5% frequency change in such an oscillator in case of temperature changes of about 50° centigrade.

It is an object of the present invention to improve the frequency stability of such voltage controlled multivibrator.

It is a primary object of the present invention to provide a new and improved feedback type oscillator modulator exhibiting linear and constant input voltage versus frequency characteristics in that the frequency is a definite and linearily changing reproduction of the input voltage, which may vary in accordance with a modulating pattern.

The subject matter of the invention itself is particularly related to an FM modulator used for magnetic recordings in which the modulator signal is a DC or AC output of a voice or a video transducer, and in which the modulator output is an FM signal used for recording on a magnetic tape or the like.

According to one aspect of the present invention in a preferred embodiment thereof it is suggested to provide the following system.

A magnetic multivibrator of the type outlined above is used, but the inductance is provided with an additional coil coupled to the multivibrator inductance coil by transformer action to establish a transformer secondary winding. The voltage induced across this secondary winding is strictly proportional to the rate of flux changes. Thereby it is immaterial what causes the flux to change. In particular, the voltage induced in this secondary winding of this saturable transformer may include components due to changes in the core losses, which in turn may result from temperature changes in the core.

A demodulator is connected to this secondary winding. In particular, this demodulator removes from the voltage induced in the secondary winding a signal corresponding to the multivibrator frequency whereby a signal is recovered which, in general, is representative of the input signal as applied to the magnetic multivibrator as controlled voltage thereof, but the demodulator output also includes components due to flux changes and due to other errors introduced into the system from external sources as well as from sources providing internal instabilities. In particular, such demodulator may be comprised of a full wave rectifier. The multivibrator is controlled by a voltage which is derived from an input circuit network, preferably a differential amplifier, to which are applied the modulator input signal and the demodulator output in such a manner that the demodulator output acts as a negative feedback. The output of this input circuit network, i.e., the output of the differential amplifier, may be passed through a low impedance network into the input of the magnetic multivibrator.

The linearity and stability of this modulator is now governed primarily by the accuracy of the negative feedback demodulator. In general demodulators have accuracies which are one order of a magnitude better than straight forward modulators, so that in fact the overall performance of this modulator is improved considerably.

Figure 2:
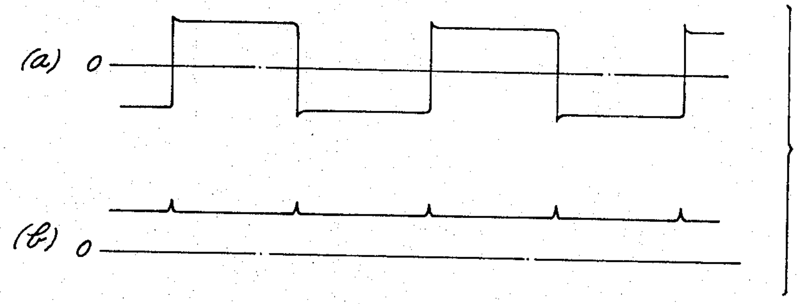
Figure 3:
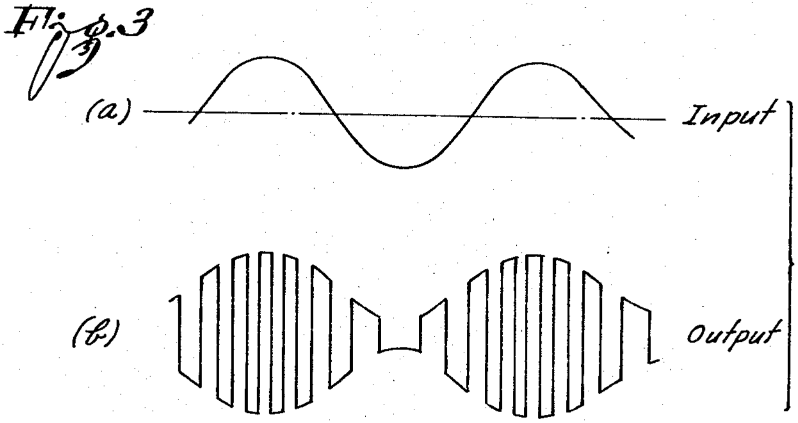

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawing, in which:

FIGURE 1 shows schematically a circuit network diagram in accordaance with the preferred embodiment of the present invention;

FIGURES 2*a* and 2*b* show time diagrams of the demodulator circuit as used in the network shown in FIGURE 1; and FIGURES 3*a* and 3*b* illustrate representative input and output signals of the network shown in FIGURE 1.

Proceeding now to the detailed description of the drawings, in FIGURE 1 thereof there is shown a magnetic oscillator 10 which is of the multivibrator type. The oscillator is comprised of two transistors 11 and 12 having their emitter electrodes interconnected directly while similar RC paths are provided in between the collector of either transistor and the base electrode of the respective other transistor.

The primary winding 13 of a saturable transformer 14 has a grounded center tap, and the ends of winding 13 are connected between the collector electrodes of the two transistors 11 and 12. The interconnected emitter electrodes of the two transistors 11 and 12 are connected to an input terminal 15 of the oscillator. The collector electrode of one of the transistors, here the collector electrode of transistor 11, constitutes the oscillator output terminal. There is no preference as to the choice of the output terminal.

Assuming that a constant positive DC voltage is applied to the terminal 15, and assuming further that at the moment transistor 11 is conductive while transistor 12 is cut off, then current flows in a particular direction through one-half of the primary winding 13. The direction is determined by the collector current in transistor 11. The voltage drop across winding 13 biases the base of transistor 12 to cut off. The transistor 11 is rendered fully conductive, so that the emitter voltage, i.e., the voltage at terminal 15 is directly applied to the winding 13, and the current flow is determined primarily by the effective inductvity of coil 13 with transformer core. The current flow increases until the core of the saturable transformer 14 saturates, i.e., until the flux in the transformer core has reached the saturation flux.

Upon reaching saturation, the transistor 11 is cut off, and a switching pulse through the base capacitor of transistor 12 renders this transistor conductive. The collector current of transistor 12 is driven through the transformer winding 13 in opposite direction until the transformer core is saturated in the opposite direction, whereupon the transistor 12 is cut off again and transistor 11 is again rendered conductive.

The frequency of oscillation thus produced depends primarily on the two factors. One is the saturation flux of the transformer core ($\theta$-sat) and the other factor is the voltage applied to terminal 15. Assuming that the saturation flux is constant and sharply defined, then the frequency of this oscillator is directly proportional to the DC voltage applied to terminal 15, since this voltage determines the "speed" with which the core of the transformer reaches saturation.

The relationship, i.e., proportionality between the DC input voltage and the frequency of this oscillator, however, is a constant one only if the flux, particularly the saturation flux of the transformer core, remains constant throughout the operation. This, however, is not the case. One of the most pronounced causes for any flux variation is a change in core losses with temperature. Particularly, eddy current induced in the core will heat the core, and the heating will increase the longer a relatively high input voltage is applied to terminal 15. Also, the temperature of the core will be low, in general, at the beginning of any oscillator operation, but after long periods of operation the core will become quite warm.

Therefore, temperature variations disturb the uniform relationship between the input voltage at terminal 15 and the frequency derivable from output terminal 16. The invention now provides for a remedy for such frequency variations regardless of the cause thereof; while temperature stabilization is of primary interest, the inventive measures are destined to counteract any cause for a change in the induced voltage of such core, by forcing the core to follow a square loop saturation curve.

A secondary winding 17 is placed on the core of the inductance to complete the transformer 14 and having also a center tap which is connected to a common return terminal such as ground. A full wave rectifier 18 comprised of two diodes is connected to the secondary winding 17. Specifically, the anodes of the two diodes are connected to the ends of the transformer winding 17, while the cathodes of the two diodes are interconnected to define the positive rectifier terminal. The center tap of winding 17 is, of course, the negative rectifier terminal.

This rectifier defines a demodulator-feedback network. FIGURE 2A illustrates the voltage induced across the secondary winding 17 in case a constant voltage is applied to terminal 15. The voltage blocks developed across secondary winding 17 are more or less rectangularly shaped due to a more or less rectangular hysteresis loop of the transformer core. FIGURE 2B illustrates the rectifier output voltage.

In accordance with Faraday's law the secondary voltage induced in winding 17 is proportional to the differential quotient $d\theta/dt$ whereby the proportionality factor is the number of windings of the secondary 17. The flux $\phi$ induced into the transformer by the primary winding is proportional to the saturation flux $\phi$-sat multiplied by a periodic function which is periodic in time. Thus, this periodic function is periodically variable in accordance with a dimensionless variable that is the product of time and the oscillator frequency.

The differentiation of such a function ($d\phi/dt$) yields among other components, the product of this periodic function times the differential quotient of the saturation flux. This component is not zero because the presumably constant saturation flux will change in time due to temperature changes. Another additive component in the differentiation $d\phi/dt$ is the product of three factors. One factor is the saturation flux itself. The second factor is the differentiated periodic function which by itself is a periodic function of the product of frequency and time. The third factor is the sum of frequency and of the product of time and differentiation quotient of the frequency. The frequency change in time is also due to saturation flux changes influencing the periodic transistor operation in the primary circuit of the transformer.

It, therefore, appears that the secondary voltage developed across the secondary winding 17 includes all changes resulting from a change in flux, particularly changes of the leakage flux, and changes in the frequency due to temperature variations in the core losses.

The output voltage of rectifier 18 is proportional to the input voltage applied to terminal 15 but has superimposed components resulting from saturation flux variations. This rectifier demodulator eliminates only the carrier frequency of the oscillator, while errors of the carrier frequency are actually internal modulations recovered by the demodulator rectifier.

The rectifier output is fed into a feedback loop 19. A summing network 20 adds the rectifier output voltage to a constant voltage derived from a source of negative potential —E via a Zener diode 21. The adjustment of the summing network 20 will be explained more fully below.

The modulator input proper is applied to a terminal 22 resistively connected to the base electrode of a transistor 23 pertaining to a differential amplifier 25. A transistor 24 constitutes the other transistor for this differential amplifier 25.

The emitter electrodes of the two transistors 23 and 24 are interconnected directly, and they are connected through a biasing resistor to a source of negative potential for common bias. The collector electrodes of the two transistors 23 and 24 are resistively and individually connected to a source of positive potential. The output of the summing network 20 is applied to the base electrode of transistor 24.

In view of the fact that a differential amplifier is employed, the output of rectifier 18 serves as a negative feedback signal. The collector electrode of transistor 24 serves as output of the differential amplifier 25 and is connected to the base electrode of a transistor 27 which is connected together with a transistor 26 in a compound emitter follower configuration.

The emitter follower amplifier 28 as provided by the interconnection of the two transistors 26 and 27 provides a low impedance circuit input for the multivibrator 10. The purpose of providing a low impedance input circuit for the multivibrator is to be seen in that the current fed during one-half cycle of the multivibrator through terminal 15 to multivibrator 10 increases in time. If the input impedance were relatively high then the voltage as effective at terminal 15 would decrease for an increasing voltage drop across the input impedance of the multivibrator. This is an undesired effect and can be avoided by providing a low impedance multivibrator input circuit such as the stage 28.

The collector electrode of transistor 26 is connected directly to the input terminal 15 of multivibrator 10. The output signal of the emitter follower stage 28 is derived from the collector electrode of transistor 26 and is in phase with the input signal applied to terminal 22. This results in an increase of output frequency for positive going input signals. The output voltage of the compound emitter follower stage 28 is out of phase with the feedback signal input voltage from line 19 resulting in a negative feedback stabilization.

The summing network 20 is adjusted so that zero voltage is applied to the base electrode of transistor 24 in case the input voltage as applied to terminal 22 is also zero. This balancing of the loop is attained independently from the coupling impedance as between base electrode of transistor 23 and the source of the input signal. The bias of the differential amplifier stage 25 is adjusted so that for zero input at terminal 22 a particular voltage is applied to terminal 15. This particular voltage value runs the multivibrator at a frequency which in effect can be regarded as the carrier frequency of this particular oscillator.

For positive going input voltages at terminal 22, the voltage at terminal 15 is likewise increasing, so that the frequency of the multivibrator 10 increases above the carrier frequency; for negative going signal input voltages the multivibrator frequency is below the carrier frequency, so that in effect a frequency modulation is produced. As the input D.C. voltage at terminal 22 is varied periodically in accordance with a desired modulating signal, a true frequency modulation is obtained, because the frequency of multivibrator 10 changes periodically with the input voltage. Depending upon the adjusted bias as applied to transistor 23, the input voltage at terminal 22 may be A.C. or D.C., and the voltage applied to the differential amplifier from the summing network 20 will be A.C. or D.C. accordingly with a common ground potential serving as the zero line. Preferably, the input circuit network 22 may include transducers responsive to audio or video analog signals to be recorded on a magnetic tape or the like. In any event, the voltage applied to terminal 15 is a D.C. voltage of variable magnitude.

The negative feedback as applied to the base electrode of transistor 24 is out of phase with such variations of the input modulator voltage. It is significant, that this negative feedback loop as provided by the demodulator output feeds back into the modulator input circuit a compounded error signal which includes all deviations of the multivibrator from constant carrier frequency operation regardless of cause. In case errors balance, they are eliminated in the feedback loop, in case they add the feedback loop causes their reduction.

For example, the above mentioned core temperature may occur as the result of self-heating of the core. Ambient temperature variations may further increase the core temperature. All temperature changes shift the core losses and, therefore, may tend to alter the carrier frequency and the entire band of signal frequencies as derived from output terminal 16. D.C. amplifier drift, changes in the collector to emitter saturation voltages of the oscillator switching transistor 11 and 12 and other changes, etc. are all summed instantaneously and sensed by the transformer secondary, and appear as a demodulator or rectifier output to be fed back as negative feedback into the modulator input circuit, in this case the differential amplifier 25.

Furthermore, solid state diodes used as rectifier elements exhibit a temperature coefficient which introduces into the feedback loop a component which is in agreement with required signal changes to compensate saturation flux changes. The amount of such temperature dependent feedback changes can be selected further by connecting additional diodes in series with the feedback loop, since the feedback loop is predominantly responsible for frequency stability. As a result of this demodulator negative feedback network the frequency of the multivibrator 10 and the input voltage vs. the frequency characteristics or the characteristic of input voltage at terminal 22 vs. frequency at terminal 16, is stabilized. It should be mentioned that additionally the ripples shown in FIGURE 2*b* and appearing periodically on the rectified feedback voltage, are also being attenuated due to this negative feedback action, thus improving the rise time and flatness of the square wave voltage waveform from transformer winding 17.

In terms of definite numerical figures it can be mentioned that the frequency accuracy as resulting from this magnetic feedback improves the linearity of the voltage versus frequency characteristics by approximately one order of magnitude. The frequency drifts and harmonic distortions due to temperature changes are also improved by approximately one order of magnitude.

FIGURE 3*a* illustrates a modulator voltage as applied to terminal 22, and FIGURE 3*b* illustrates the resulting output wave train derivable from terminal 16. There may be connected a limiter or a gain control network eliminating from the signal as shown in FIGURE 3*b* the amplitude modulation, because such amplitude modulation is not needed and may even be undesirable.

The output circuit connected to terminal 16 may include such limiter and other elements required for effecting an FM signal recording on a magnetic tape, disc or the like.

The invention is not limited to the embodiments described above, but all changes and modifications thereof not constituting departures from the spirit and scope of the invention are intended to be covered by the following claims.

What is claimed is:

1. A modulator oscillator comprising:

a saturable transformer having first and second windings and a saturable core having substantially rectangular hysteresis loop;

two electronic switching elements interconnected to provide a common input terminal and being further interconnected through said first winding for alternating switching action, and for periodically driving said core into saturation in alternate directions;

a demodulator connected to said second winding;

an input network for receiving a modulator input signal and for feeding same to said common input terminal;

means for connecting the input network to a source of power supply independently from the supply of the modulator input signals;

and means for feeding said demodulator output as negative feedback to said input network to modify the input signal as applied to said common input terminal in accordance with signals representing flux variations of said core and appearing at the input side of said demodulator.

2. An FM modulator oscillator comprising:

a magnetic multivibrator including a saturable core and a DC input voltage terminal;

a feedback winding on said core in magnetically coupled relationship therewith;

a demodulator connected to said feedback winding and responsive to an alternating voltage induced in said feedback winding upon changes in flux in said core;

an input circuit connected to be responsive to a variable modulator signal and to be further responsive to said demodulator output and forming a signal representative of the difference thereof, the input circuit being connected additionally to an independent source of power supply; and
low output-impedance signal means for feeding the signal as provided by the input circuit to said input voltage terminal.

3. An FM modulator oscillator, comprising:
an electric circuit element having nonlinear characteristics as between electrical input and output signals;
switching means connected to said circuit element for driving said circuit element periodically along said nonlinear characteristics by governing the input signal thereof in response to nonlinear variations of said output signals;
DC signal means controlling said switching means and governing the rate of oscillation of said switching means as driving said circuit element in dependence upon the amplitude of the DC signal provided to the switching means;
a demodulator connected to said circuit element and being responsive to a signal representative of said output signal and providing a demodulator output;
and signal means for connection to an independent source of power supply and being further responsive to a modulator signal of variable amplitude and combining it with said demodulator output by negative summation and providing a combined output to said DC signal means for controlling said switching means in dependence upon the amplitude variations of the modulator signal.

4. An FM modulator oscillator comprising:
a saturable transformer having first and second windings;
a pair of transistors having their collector electrodes respectively connected to opposite ends of said first winding;
means for connecting the base electrode of either one of said pair of transistors to the end of said first winding to which is connected the collector electrode of the respective other one of said pair of transistors;
an emitter follower amplifier network having its output side connected to the two emitter electrodes of said pair of transistors;
a differential amplifier having two input terminals and an output terminal, said output terminal being connected to the input side of said emitter follower stage;
a full wave rectifier connected to said second winding and having DC output terminal connected to said one input terminal of said differential amplifier;
and means for connecting the source of modulator signals to the other one of said differential amplifier input terminal.

5. An FM modulator oscillator comprising:
a magnetic multivibrator including a saturable core and a DC input voltage terminal;
a feedback winding in magnetically coupled relationship with said core and responsive to flux variations in said core;
a demodulator connected to said feedback winding and responsive to any alternating voltage induced in said feedback winding upon changes in flux in said core;
a differential amplifier connected to be responsive to a modulator input signal and the output furnished by said demodulator and establishing an output signal; and
means for feeding said output signal to said DC input terminal, whereby at a predetermined modulator input signal said multivibrator oscillates at a carrier frequency, frequency modulated upon deviations of said modulator input signal from said predetermined input signal.

6. An FM modulator oscillator comprising:
a magnetic multivibrator including a saturable core and a DC input voltage terminal;
a feedback winding on said core in magnetically coupled relationship therewith;
a demodulator connected to said feedback winding and responsive to an alternating voltage induced in said feedback winding upon changes in flux in said core; and
signal means responsive to a modulator signal and combining therewith the unfiltered demodulator output at out of phase relationship to form a combined signal and feeding same to said DC input voltage terminal the signal means having broadband characteristics whch includes the multivibrator frequency.

7. In a modulator oscillator having a saturable inductance including a first winding on a saturable core of substantially rectangular hysteresis loop, further having
two electronic switching elements interconnected to provide a common input terminal and being further interconnected through said first winding for alternating switching action, and for periodically driving said core into saturation in alternate directions, the improvement comprising:
a second winding on said inductance and inductively coupled to said first winding through said core;
a demodulator connected to said second winding;
first means for connection to an independent source of power supply and having two signal input terminals and having characteristics of forming an output signal representative of the difference between two signals when respectively applied to the two input terminals, the first means being connected to apply the output signal to said common input terminal;
an input circuit for receiving a modulator input signal and for feeding same to one of said input terminals of said first means; and
second means for feeding said demodulator output to the other one of said input terminals of said first means to modify the input signal as applied to said one input terminal in accordance with signals representing flux variations of said core and appearing at the input side of said demodulator.

8. An FM modulator oscillator comprising:
a magnetic multivibrator including a saturable core and a DC input voltage terminal;
a feedback winding on said core in magnetically coupled relationship therewith;
a demodulator connected to said feedback winding and responsive to an alternating voltage induced in said feedback winding upon changes in flux in said core, and producing an output signal representative thereof;
a source of constant reference voltage;
first signal means combining said demodulator output signal and said reference voltage;
an input circuit responsive to a variable modulator signal and combining therewith the output produced by said signal means at out of phase relationship and to form a combined signal;
and second signal means for feeding said combined signal to said input voltage terminal to adjust the frequency of said multivibrator.

9. In a signal transducing network for providing an FM signal representative of an information signal to be recorded on a magnetic tape, the combination comprising:
a saturable transformer having first and second windings and a saturable core having substantially rectangular hysteresis loop;
two electronic switching elements interconnected to provide a common input terminal and being further interconnected through said first winding for alternating switching action, and for periodically driving said core into saturation in alternate directions;
a demodulator connected to said second winding;

first means for connection to an independent source of power supply and having two signal input terminals and having characteristics for forming an output signal representative of the difference between two signals respectively applied to the two input terminals, the first means being connected to apply the output signal to said common input terminal;

an input circuit network for receiving a modulator input signal and for feeding same to one of said input terminals of said first means;

second means for feeding said demodulator output to the other one of said input terminals of said first means to modify the input signal as applied to said one input terminal in accordance with signals representing flux variations of said core and appearing at the input side of said demodulator;

and means for deriving an FM signal from one of said first and second windings.

10. An FM modulator oscillator comprising:

a magnetic multivibrator including a saturable core and a DC input voltage terminal;

a feedback winding on said core in magnetically coupled relationship therewith;

a diode rectifier connected to said feedback winding and responsive to an alternating voltage induced in said feedback winding upon changes in flux in said core;

a differential amplifier connected to be responsive to a modulator input signal and the output furnished by said demodulator and establishing an output signal; and means for feeding said output signal to said DC input terminal, whereby at a predetermined modulator input signal said multivibrator oscillates at a carrier frequency, frequency modulated upon deviations of said modulator input signal from said predetermined input signal.

11. An FM modulator oscillator comprising:

a magnetic multivibrator including a saturable core and a DC input voltage terminal;

a feedback winding on said core in magnetically coupled relationship therewith;

a feedback network including non-linear impedance means and being connected to said feedback winding to be responsive to an alternating voltage induced in said feedback winding upon changes in flux in said core;

a first input circuit connected to be responsive to a reference signal and to be further responsive to the output of said feedback network to form an error signal representative of the deviation of the multivibrator frequency from a preselected carrier frequency in accordance with the value of the reference signal;

a second input circuit connected to be responsive to a variable modulator signal and to the error signal to form a combined signal having characteristics so that for a particular error signal at modulator signal zero, the multivibrator oscillates at said carrier frequency;

and signal means for feeding said combined signal to said input voltage terminal.

12. An FM modulator oscillator, comprising:

an electric circuit element having nonlinear characteristics as between electrical input and output signals;

switching means connected to said circuit element for driving said circuit element periodically along said nonlinear characteristics by governing the input signal thereof in response to nonlinear variations of said output signals;

a demodulator connected to said circuit element and being responsive to a signal representative of said output signal and providing a demodulator output;

a differential amplifier connected to be responsive to a modulator input signal and the output furnished by said demodulator and establishing an output signal; and means for feeding the output signal of said differential amplifier to said switching means, whereby at a predetermined modulator input signal said multivibrator oscillates at a carrier frequency, frequency modulated upon deviations of said modulator input signal from said predetermined input signal.

References Cited

UNITED STATES PATENTS

| | | | |
|---|---|---|---|
| 1,999,190 | 4/1935 | Hansell | 332—18 X |
| 2,843,745 | 7/1958 | Smith | 332—14 X |
| 2,848,614 | 8/1958 | Lyons | 331—113 |
| 2,968,738 | 1/1961 | Pintell | 331—113 |
| 3,155,824 | 11/1964 | Rotier | 332—14 X |
| 3,192,464 | 6/1965 | Johnson et al. | 331—113 |

ROY LAKE, *Primary Examiner.*

ALFRED L. BRODY, *Examiner.*